US009566920B2

(12) United States Patent
Melzl et al.

(10) Patent No.: US 9,566,920 B2
(45) Date of Patent: Feb. 14, 2017

(54) CIRCUIT ARRANGEMENT COMPRISING A MONITORING DEVICE (75) Inventors: Hubert Melzl, Pentling (DE); Reinhart Weber, Regensburg (DE); Harald Haug, Landshut (DE)

(73) Assignee: Continental Automotive GmbH, Hannover (DE)

( * ) Notice: Subject to any disclaimer, the term of this patent is extended or adjusted under 35 U.S.C. 154(b) by 825 days.

(21) Appl. No.: 13/979,248

(22) PCT Filed: Dec. 22, 2011

(86) PCT No.: PCT/DE2011/002174
§ 371 (c)(1),
(2), (4) Date: Jul. 11, 2013

(87) PCT Pub. No.: WO2012/097775
PCT Pub. Date: Jul. 26, 2012

(65) Prior Publication Data
US 2013/0285445 A1 Oct. 31, 2013

(30) Foreign Application Priority Data

Jan. 21, 2011 (DE) .......... 10 2011 009 183
Jan. 25, 2011 (DE) .......... 10 2011 009 389

(51) Int. Cl.
*B60R 16/03* (2006.01)
*G06F 1/28* (2006.01)
*G06F 11/07* (2006.01)

(52) U.S. Cl.
CPC .......... *B60R 16/03* (2013.01); *G06F 1/28* (2013.01); *G06F 11/0739* (2013.01); *G06F 11/0751* (2013.01)

(58) Field of Classification Search
None
See application file for complete search history.

(56) References Cited

U.S. PATENT DOCUMENTS 6,438,462 B1 * 8/2002 Hanf .......... G06F 1/3203
340/693.4
6,704,628 B1  3/2004 Fennel et al.
(Continued)

FOREIGN PATENT DOCUMENTS

DE  197 43 463   4/1999
DE  102 05 809  12/2002
(Continued)

OTHER PUBLICATIONS

International Search Report of the International Searching Authority for International Application PCT/DE2011/002174, mailed Jul. 6, 2012, 2 pages, European Patent Office, HV Rijswijk, Netherlands.
(Continued)

*Primary Examiner* — Jared Fureman
*Assistant Examiner* — Joel Barnett
(74) *Attorney, Agent, or Firm* — W. F. Fasse (57) ABSTRACT A circuit arrangement and a method are provided to avoid an uncontrolled discharge of the battery of a motor vehicle in the event of a defective initialization of an electronic control unit in the motor vehicle. The initialization process is monitored, and the result thereof controls a supply voltage which is fed via a voltage-monitoring line to a monitoring device of a bus-transceiver only when a successful initialization is detected, or the feeding or the generation of the supply voltage is interrupted when successful initialization is not detected. If the monitoring device does not detect the required supply voltage, e.g. at an appropriate time, then it cuts off power to the supply voltage unit that generates the supply voltage.

20 Claims, 6 Drawing Sheets (56) References Cited

U.S. PATENT DOCUMENTS

| | | | |
|---|---|---|---|
| 6,838,783 B2 | 1/2005 | Stierle et al. | |
| 8,750,351 B2 * | 6/2014 | Muth | H04L 12/12 375/219 |
| 2002/0198638 A1 | 12/2002 | Haag et al. | |
| 2007/0241614 A1 | 10/2007 | Busdiecker et al. | |
| 2008/0123678 A1 * | 5/2008 | Hartwich | G06F 13/4009 370/419 |
| 2012/0042186 A1 * | 2/2012 | Rott | H04L 12/12 713/323 |

FOREIGN PATENT DOCUMENTS

| | | |
|---|---|---|
| DE | 102005041895 | 3/2007 |
| DE | 102 96 400 | 7/2007 |
| DE | 102006051909 | 7/2007 |
| EP | 1 626 322 | 2/2006 |

OTHER PUBLICATIONS

PCT International Preliminary Report on Patentability including English Translation of PCT Written Opinion of the International Searching Authority for International Application PCT/DE2011/002174, issued Jul. 23, 2013, 6 pages, International Bureau of WIPO, Geneva, Switzerland.

German Search Report for German Application No. 10 2011 009 183.1, dated Sep. 26, 2011, 5 pages, Muenchen, Germany, with English translation, 5 pages.

* cited by examiner

CIRCUIT ARRANGEMENT COMPRISING A MONITORING DEVICE

FIELD OF THE INVENTION

The invention relates to a circuit arrangement for a control unit in a motor vehicle for converting an activation signal transmitted from a bus system to the control unit, with monitoring of the initialisation of the control unit, and to a method for operating said control unit.

BACKGROUND INFORMATION

Motor vehicles have a plurality of electronic components or control units. To reduce the consumption of electrical power in the motor vehicle, some of these control units are transferred into a sleep mode, in case they are not in use. There are different possibilities to wake up or activate a control unit from a sleep mode when starting a motor vehicle or with an applied use. In modern motor vehicles, for example, several control units are networked via a bus line or a bus system, said bus system in a motor vehicle usually being a CAN-bus. Typically, those control units which are in a sleep mode, also known as sleep mode or stand-by mode, can be woken up or set into an operating mode by means of an activation signal, also known as wake-up signal or bus-wake-up pattern.

Such a bus system is described for example in patent specification DE 102 96 400 B4. In a communication network several control units of a motor vehicle are networked via a data bus. The network further comprises a monitoring unit, which can emit a wake-up signal onto the data bus, to wake up the individual control units as required.

Normally, therefore a sleeping control unit receives an activation signal via a bus system, whereupon an initialisation of the control unit from a sleep mode to an operating mode is effected, including the generation of internal system voltages. To reset the control unit thereafter into a sleep mode, the control unit must be able to independently receive the call to sleep from the BUS, thereupon to signal its willingness to sleep and to set itself independently into a sleep mode.

If, during the initialisation of the control unit, an error occurs, it would not be possible to deactivate the control unit again until the power supply is disconnected.

Thus, with known control units, it is disadvantageous that a defective control unit can no longer pass into a sleep mode, in particular, if there is a malfunction during initialisation of the control unit. In this case all the time power is demanded from the vehicle battery, what can lead to a failure of the power supply and thus to a breakdown of the motor vehicle.

SUMMARY OF THE INVENTION

It is, therefore, the object of the invention to indicate a solution to the problems mentioned above, in order to avoid such failures and in particular unintended discharging of the vehicle battery by control units having a malfunction.

This object is achieved by embodiments of a circuit arrangement as disclosed and claimed herein. Advantageous embodiments and further developments according to the invention are also disclosed and claimed herein, with combinations and further developments of individual features with each other being conceivable.

A basic idea of embodiments of the invention is to design a control unit with a special circuit arrangement, which converts an activation signal transmitted from a bus-network to the control unit such that the control unit in case of a failure during initialisation does not or does no longer provide at least one supply voltage to a monitoring device of the bus-transceiver. This reduces the power consumption of the control unit.

Moreover, in a preferred further development of the invention the power supply unit can again be deactivated or can be disconnected from the power supply and thus preferably the control unit can be set into a sleep mode.

The circuit arrangement according to an embodiment of the invention, preferably for a control unit of a motor vehicle, comprises a bus-transceiver or a CAN-transceiver, which receives an activation signal transmitted via a bus-connection to the control unit and in particular a monitoring device for monitoring the supply voltages generated in the control unit. The circuit arrangement further comprises at least one first switch controllable by the bus-transceiver and at least one supply voltage unit, which is connected via the first switch to an external voltage input. The supply voltage unit generates with the first switch being closed at least one supply voltage for at least one microcontroller included in the control unit.

Via the at least one microcontroller, in particular with an applied supply voltage, an initialisation of the control unit is effected. Initialisation generally means a transition of the control unit from a sleep mode into an operating mode. The circuit arrangement according to an embodiment of the invention further comprises at least one first voltage-monitoring line, by means of which the at least one supply voltage generated by the supply voltage unit can be fed to the monitoring device of the bus-transceiver. Preferably, all supply voltages generated by the supply voltage unit are fed to the monitoring device of the bus-transceiver. For this purpose, several voltage-monitoring lines can be arranged between the supply voltage unit and the bus-transceiver. The one or more voltage-monitoring lines can be embodied, for example, also such that the supply voltages are picked off at voltage lines between the supply voltage unit and the at least one microcontroller.

At least one of the supply voltages generated by the supply voltage unit is fed via a voltage-monitoring line to the monitoring device of the bus-transceiver only when a successful initialisation of the control unit is detected, or the feed of said supply voltage to the monitoring device or generation of said supply voltage is interrupted, when successful initialisation of the control unit is not detected.

For this purpose, for example, at least one of the voltage-monitoring lines can be embodied with a second switch, which preferably can be controlled via the at least one microcontroller either directly or indirectly via a system monitoring device controllable from the microcontroller. The microcontroller here is particularly embodied such that the microcontroller closes the second switch only with a successful initialisation of the control unit. For the case that by means of the power supply unit only one supply voltage is generated in the control unit, said supply voltage can be fed by means of a switchable voltage-monitoring line to the monitoring device of the bus-transceiver. For the case that several supply voltages are generated by means of the power supply unit, all the supply voltages can be fed to the monitoring device of the bus-transceiver, preferably, however, only one of the voltage-monitoring lines being embodied switchable by a second switch, which can be controlled in particular by the at least one microcontroller.

Alternatively, the power supply unit itself can be embodied switchable, i.e. the supply voltage unit starts generating at least one of the supply voltages only when a successful initialisation of the control unit is detected, or interrupts the generation, when successful initialisation of the control unit is not detected.

In a preferred variant of the circuit arrangement the latter comprises a monitoring circuit with at least one system monitoring device or a system module with monitoring function. The at least one system monitoring device can be controlled in particular by the at least one microcontroller. In this preferred embodiment the second switch, with which at least one of the voltage-monitoring lines is embodied switchable, is closed not by the at least one microcontroller itself, but by the system monitoring device. The system monitoring device can be embodied for this purpose such that it checks the functionality of the at least one microcontroller and comprises at least one reset function and a watchdog function. Checking the function of the microcontroller is effected preferably cyclically, by the microcontroller sending at regular intervals a message or a status report to the system monitoring device. In the absence of and/or with a faulty status report preferably the microcontroller is reset via the system monitoring device. Sending the message or status report is also known as triggering. If the watchdog of the system monitoring device is triggered for the first time, this is in particular an indication that the microcontroller or the control unit has been successfully initialised. In this case an additional reset-like output can go upward or apart from the activation of other possible system functions, the second switch can be closed by the system monitoring device.

In this case the second switch is switched in particular directly via the system monitoring device and only indirectly via the microcontroller.

In a preferred variant of the circuit arrangement the bus-transceiver closes the first switch upon receipt of an activation signal via the bus connection of the control unit. Preferably, by the activation signal also a specific time window or a timer is activated, the bus-transceiver again deactivating or interrupting the power supply of the control unit by opening the first switch, when after expiry of the specific time window at least one supply voltage in the control unit does not correspond to a given condition. This reduces decisively the power consumption of the control unit.

The given condition can be, for example, reaching a specific voltage range and/or a specific voltage level of the at least one supply voltage until expiry of the specific time window.

In an advantageous embodiment of the circuit arrangement the bus-transceiver deactivates or interrupts the power supply of the control unit by opening the first switch only if at least one of the following conditions is not met until expiry of the specified time window:
  i) voltage at a VIO-pin of the bus-transceiver is not in the specified range
  ii) voltage at a VCC-pin of the bus-transceiver is not in the specified range.

Preferably, the monitoring device checks the voltages applied to a VIO-pin and a VCC-pin of the bus-transceiver, in particular after an activation signal has been received and until expiry of a specific time window. The time window can be, for example, a time period of 100 ms to 670 ms. The time period can be measured via a time measurement device, arranged in the bus-transceiver or in the monitoring device of the bus-transceiver, for example by means of a timer.

In a preferred variant of the circuit arrangement a successful initialisation of the control unit occurs when a specific stage of the initialisation process of the control unit is obtained or has been recognized by the at least one microcontroller. The stage can be achieved, for example, when the control unit is activated error-free, or if, for example, despite still outstanding initialisation operations by the microprocessor a faultless activation is already ensured. Initialisation operations mean e.g. various self-tests of the microcontroller or functional tests of the control unit, which are controlled by the microcontroller.

An initialisation of the control unit can, for example, also be successful when the initialisation process is fully completed, e.g. when all initialisation operations of the initialisation process are completed or when further a watchdog has been triggered for the first time, for example the watchdog of the system monitoring device, which can be arranged in a circuit arrangement according to the invention.

An essential advantage of the circuit arrangement according to an embodiment of the invention, in particular when being arranged in a control unit, is that activation or initialisation of the control unit from a sleep mode into an operating mode is effected with the participation of at least one microcontroller, wherein by arranging the bus-transceiver and the second switch or supply voltage unit controllable by the microcontroller either directly or indirectly via a system monitoring device it is ensured that the microcontroller and thus the control unit is booting correctly or otherwise the power consumption is at least reduced. Moreover, in the preferred further development the microcontroller, if needed, can trigger a transition of the control unit into a sleep mode or that the control unit can perceive or convert a deactivation signal, also known as sleep command, from the bus system of the motor vehicle.

Thus, unnecessary loads on the vehicle battery, for example at the battery terminal can be avoided, particularly in case of an error in the concerned control unit.

In an advantageous embodiment of the circuit arrangement the supply voltages monitored by the monitoring device of the bus-transceiver are a VIO-voltage and a VCC-voltage. The VIO-voltage preferably assumes values in the range of 3.3 V to 5 V and the VCC-voltage preferably a value of 5 V.

Preferably, with the circuit arrangement according to the invention with a FlexRay bus-network that voltage-monitoring line is embodied with a switch or supply voltage unit controllable by the at least one microcontroller or by at least one system monitoring device, via which the VIO-voltage is fed to the monitoring device of the bus-transceiver.

With a CAN-bus-network, however, preferably the sole or in addition that voltage-monitoring line is embodied with a switch or supply voltage unit controllable by the at least one microcontroller or by at least one system monitoring device, via which the VCC-voltage is fed to the monitoring device of the bus-transceiver.

BRIEF DESCRIPTION OF THE DRAWINGS

Further advantages and optional embodiments will be become apparent from the description and the drawings. Exemplary embodiments are illustrated in the drawings in simplified form and are further explained in the ensuing description. Hereinafter functionally identical and/or identical elements are generally referred to by the same reference numerals.

DETAILED DESCRIPTION OF EXAMPLE EMBODIMENTS OF THE INVENTION

Figure 1:
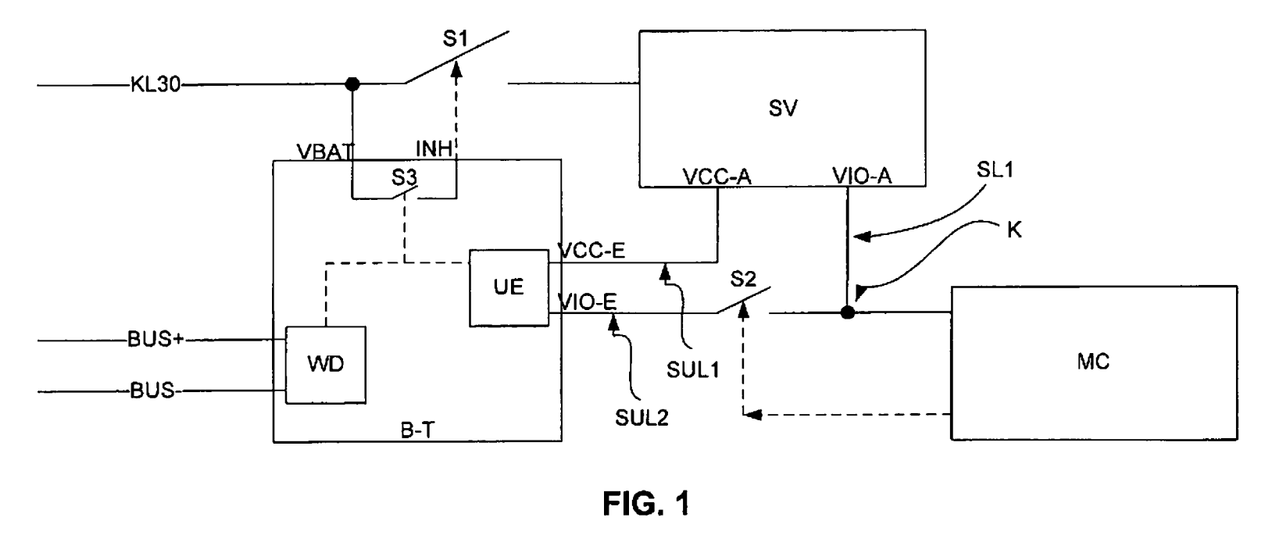
FIG. 1 shows the structure of a circuit arrangement with switchable VIO-voltage.

In FIG. 1 an example of a circuit arrangement according to the invention is shown, which can be arranged in a control unit of a motor vehicle, wherein the control unit should be able to be woken up via bus telegrams for example CAN-bus or FlexRay-bus. The control unit can be for example an air bag control unit. The circuit arrangement comprises a bus-transceiver (B-T), in this case an FXR-transceiver with internal fail-safe function, which receives via bus-lines (bus+; bus−) an activation signal transmitted to the control unit. The activation signal, also known as wake-up signal or bus-wake-up pattern, is recognized in particular by a wake-up-detector (WD) of the bus-transceiver (B-T). The control unit is connected to a permanent battery terminal (KL30), in this case, a terminal 30 of a vehicle battery. Via the VBat-access of the bus-transceiver (B-T) the latter is fed with voltage, even when the first switch (1) is still open. Since the bus-transceiver (B-T) is optimized for low power consumption, the current drain of the control unit remains above it in the admissible microampere range.

Upon receipt of an activation signal by the bus-transceiver (B-T) the switch (S3) integrated in the bus-transceiver (B-T) is closed, causing a first switch (S1) of the circuit arrangement to be closed via the INH-pin (INH) of the bus-transceiver (B-T). In principle, the first switch (S1) could also be switched directly, i.e. the third switch (S3) could be replaced by alternative circuit elements or alternatively, instead of the here external first switch (S1) the first switch (S1) could be arranged also within the bus-transceiver (B-T). By external embodiment of the first switch (S1) the latter can be optimized more easily as a power transistor to the switching of higher currents and voltages, i.e. when being integrated into the bus-transceiver.

In addition, upon receipt of the activation signal a timer is started in the monitoring device (UE) of the bus-transceiver (B-T) or a specific time window is activated.

By closing the first switch (S1) the power supply of the control unit is activated. A supply voltage unit (SV), which is connected via the first switch (S1) to the voltage input (KL30), generates with a closed switch (S1) the internal system voltages or supply voltages required for the control unit or for the system modules arranged in the control unit. In this case, the supply voltage unit (SV) generates a VIO-voltage for a microcontroller (MC) and a VCC-voltage. The microcontroller (MC) is connected via a voltage line (SL1) to the VIO-pin (VIO-A) of the supply voltage unit (SV).

The supply voltages generated by the supply voltage unit (SV) are fed in this exemplary embodiment via voltage-monitoring lines (SUL1; SUL2) to the bus-transceiver (B-T) or to its monitoring device (UE). A voltage-monitoring line (SUL1) is directly applied to the VCC-pin (VCC-A) of the supply voltage unit (SV), whereas another voltage-monitoring line (SUL2) picks off the VIO-voltage generated by the supply voltage unit (SV) at a node (K) of the voltage line (SL1). Here, the voltage-monitoring line (SUL2), which picks off the VIO-voltage at the voltage line (SL1), is embodied switchable via a second switch (S2). The second switch (S2) can be controlled via the microcontroller (MC). The controllable embodiment of the VIO-voltage is particularly advantageous for FlexRay-bus-networks, since there lower currents have to be switched other than via the VCC-supply voltage.

If the supply voltage unit (SV) generates the supply voltages after closing the first switch (51), then an initialisation of the control unit is effected via the microcontroller (MC). During initialisation, for example, various self-tests are performed in the microcontroller (MC). If the initialisation is successfully completed and/or a watchdog of the control unit has been triggered for the first time, a second switch (S2) is closed by the microcontroller (MC). In the error-free state, particularly with an error-free initialisation of the microcontroller (MC) or of control unit, the second switch (S2) is closed before expiry of the timer or the time window in the monitoring device (UE) of the bus-transceiver.

The monitoring device (UE) of the bus-transceiver (B-T) is designed such that the bus-transceiver (B-T), after expiry of the specified time window or after expiry of a fixed period of time, for example a duration of 100 ms to 670 ms, again opens the first switch (S1) via the INH-pin (INH) and thus deactivates the power supply of the control unit, when one or more conditions are not met by expiry of the time window. The conditions that must be met by expiry of the time window can be chosen differently. In the shown exemplary embodiment the monitoring device (UE) monitors whether the supply voltages, which are applied to the VIO-pin (VIO-E) and VCC-pin (VCC-E) of the bus-transceiver (B-T) have reached a certain voltage level within the time window. For example, for both voltages at the VIO-pin (VIO-E) and VCC-pin (VCC-E) a specific range could be specified, in which the respective voltages must lie until expiry of the time window.

The functional principle of the circuit arrangement according to the invention therefore represents as follows. For the case of a malfunction during initialisation via the microcontroller (MC) the second switch (S2) is not closed. The given conditions at the monitoring device (UE) of the bus-transceiver (B-T) can consequently not be met, whereupon in the preferred embodiment of the bus-transceiver (B-T) by opening the first switch (S1) the power supply of the control unit is deactivated, i.e. is separated from the battery voltage (Kl30). Thus, preferably also the control unit is reset into a sleep mode or stand-by mode. This takes place in particular also if the bus-activity is continued. With a successful initialisation of the microcontroller (MC) or the control unit, however, the second switch (S2) would be closed by the microcontroller (MC) and the control unit would successfully change into an operating mode.

Thus, by the proposed circuit arrangement it can be avoided that a control unit due to an error during initialisation remains for example in a permanent reset state and consequently could no longer be set into a sleep mode, which would result in unintentional discharge of the vehicle battery. For the case that during initialisation an error occurs, the control unit is again disconnected from the power supply, whereupon, for example, a warning signal, e.g. by means of a warning lamp, can be output to the driver, in order to inform him on the malfunction of the concerned control unit. The current consumption drops in this case again below the permitted quiescent current and there is no risk of a battery discharge.

If the bus-transceiver (B-T) of the control unit again receives an activation signal from the bus system, the power supply of the control unit can be re-activated via the first switch (S1) and the microcontroller (MC) thus can obtain a further opportunity to correctly initialise the control unit.

Figure 2:
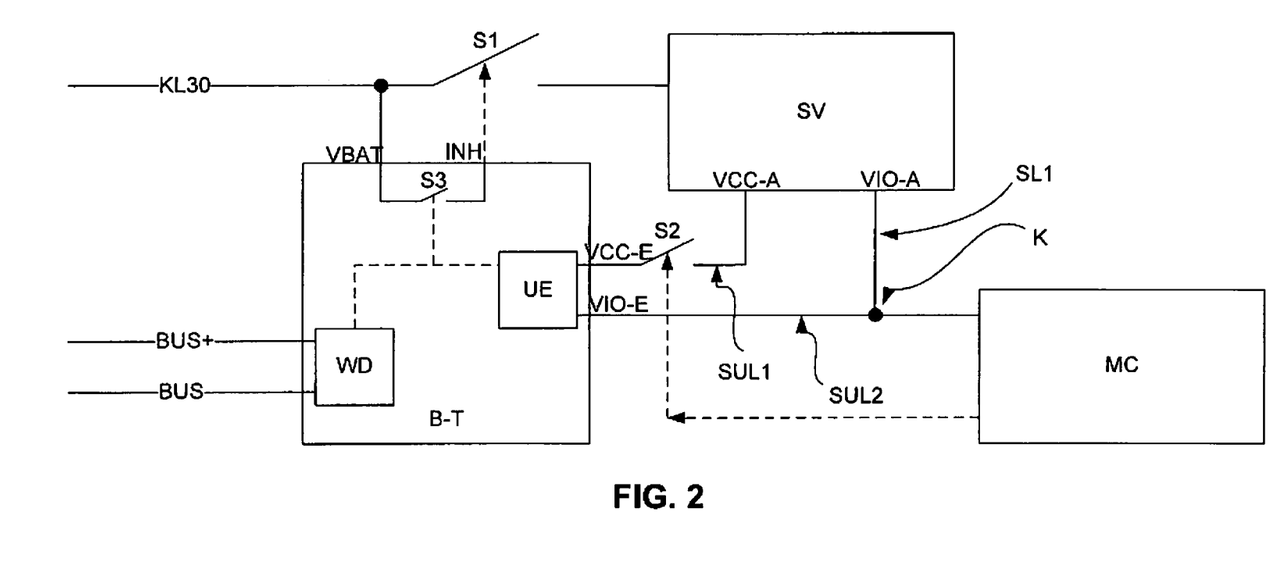
FIG. 2 shows the structure of a circuit arrangement with switchable VCC-voltage.

In FIG. 2 a further exemplary embodiment of a circuit arrangement according to the invention is illustrated and largely corresponds to the description of FIG. 1. The circuit arrangement from FIG. 2 merely differs from that of FIG. 1 in that the voltage-monitoring line (SUL1), which picks off the VCC-voltage directly at the VCC-pin (VCC-A) of the supply voltage unit (SV), is embodied switchable by means of a second switch (S2) controllable by the microcontroller (MC). The embodiment is particularly suitable for CAN-bus-systems, as there switching of the VIO-voltage is not possible without further disadvantages.

The voltage-monitoring line (SUL2), which picks off the VIO-voltage at the node (K) of the voltage line (SL1), correspondingly in the exemplary embodiment of FIG. 2 is embodied not switchable.

Figure 3:
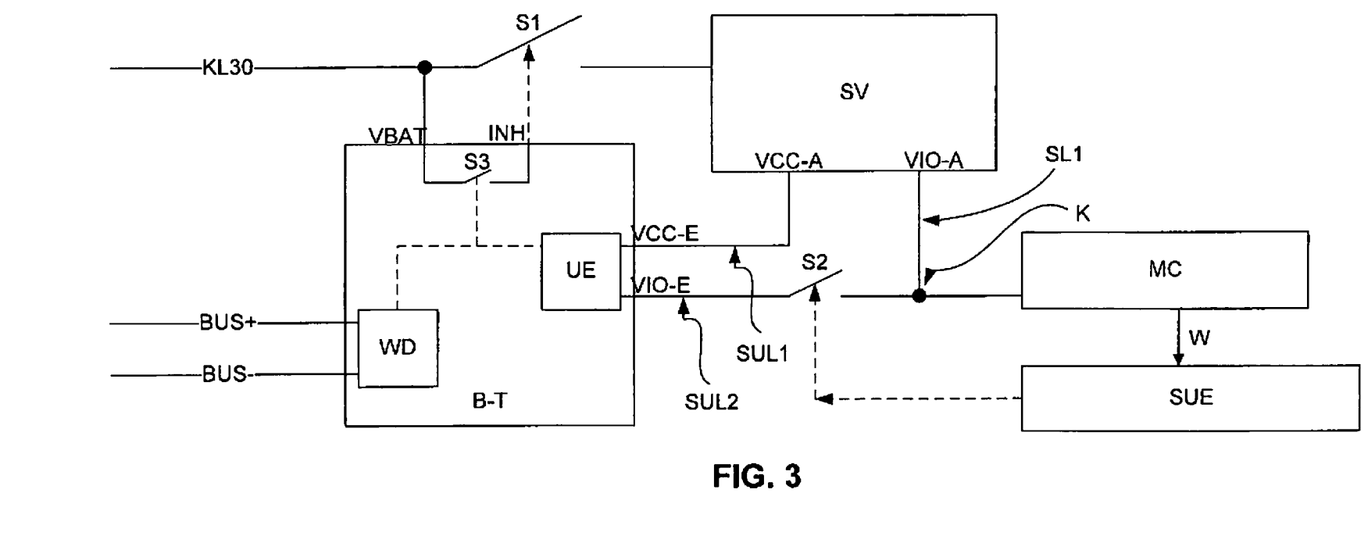
FIG. 3 shows the structure of a circuit arrangement according to FIG. 1 with monitoring circuit.

FIG. 3 shows a further example of a circuit arrangement according to the invention. The circuit arrangement here is largely designed corresponding to the description of FIG. 1. However, in FIG. 3 the second switch (S2) is not closed directly via the microcontroller (MC), but via a system monitoring device (SUE), which can be controlled via the microcontroller (MC). If the initialisation of the control unit or the microcontroller (MC) is successfully completed and if a watchdog of the system monitoring device (SUE) has been triggered for the first time, the second switch (S2) can be closed by the system monitoring device (SUE). By the arrangement of the system monitoring device (SUE), which in particular comprises a watchdog function and a reset function, in this case a monitoring circuit is realized, by means of which it is checked whether the microcontroller (MC) is working error-free. The check is performed in particular cyclically, by the microcontroller (MC) sending at regular intervals a message or status report (W) to the system monitoring device. Sending the message or status report (W) is also known as triggering. If the watchdog is triggered for the first time, then it is an indication that the microcontroller (MC) or the control unit has been successfully initialised.

Figure 4:
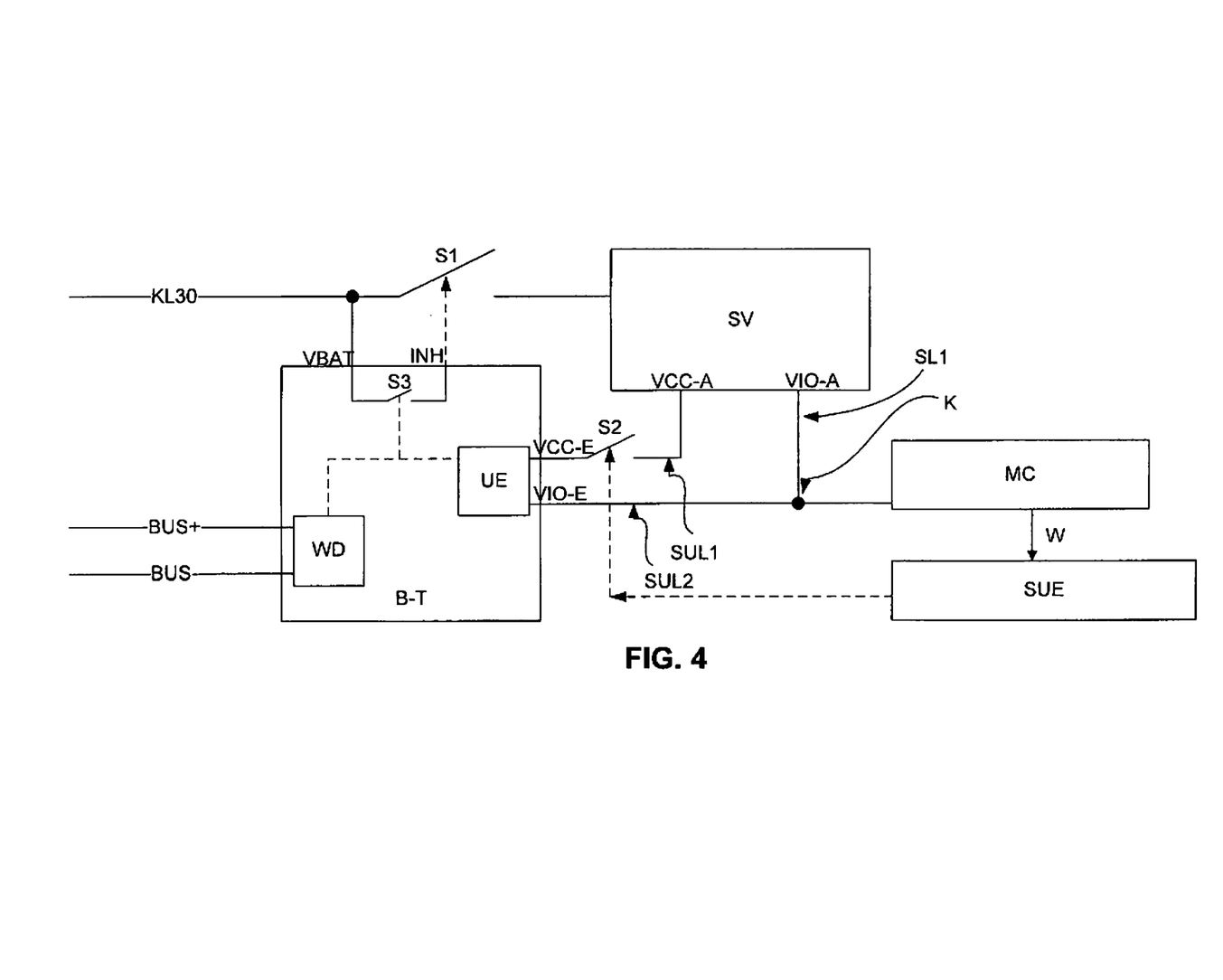
FIG. 4 shows the structure of a circuit arrangement according to FIG. 2 with monitoring circuit.

In FIG. 4 a further circuit arrangement according to the invention is illustrated, which largely corresponds to the circuit arrangement of FIG. 2, wherein a monitoring circuit is integrated into the circuit arrangement. The monitoring circuit is designed according to the monitoring circuit of FIG. 3.

Preferably, a circuit arrangement according to the invention would be embodied according to FIG. 1 or according to FIG. 3, as here only very small currents have to be switched via the second switch (S2). However, there are bus modules or system elements in control units, which allow leakage currents to VIO via internal protective structures. In this case the VIO-pin (VIO-E) of the bus-transceiver (B-T) would be sufficiently supplied despite the open switch (S2). The protective mechanism according to the invention would not be optimal. In this case an embodiment according to FIG. 2 or FIG. 4 is to be preferred.

Figure 5:
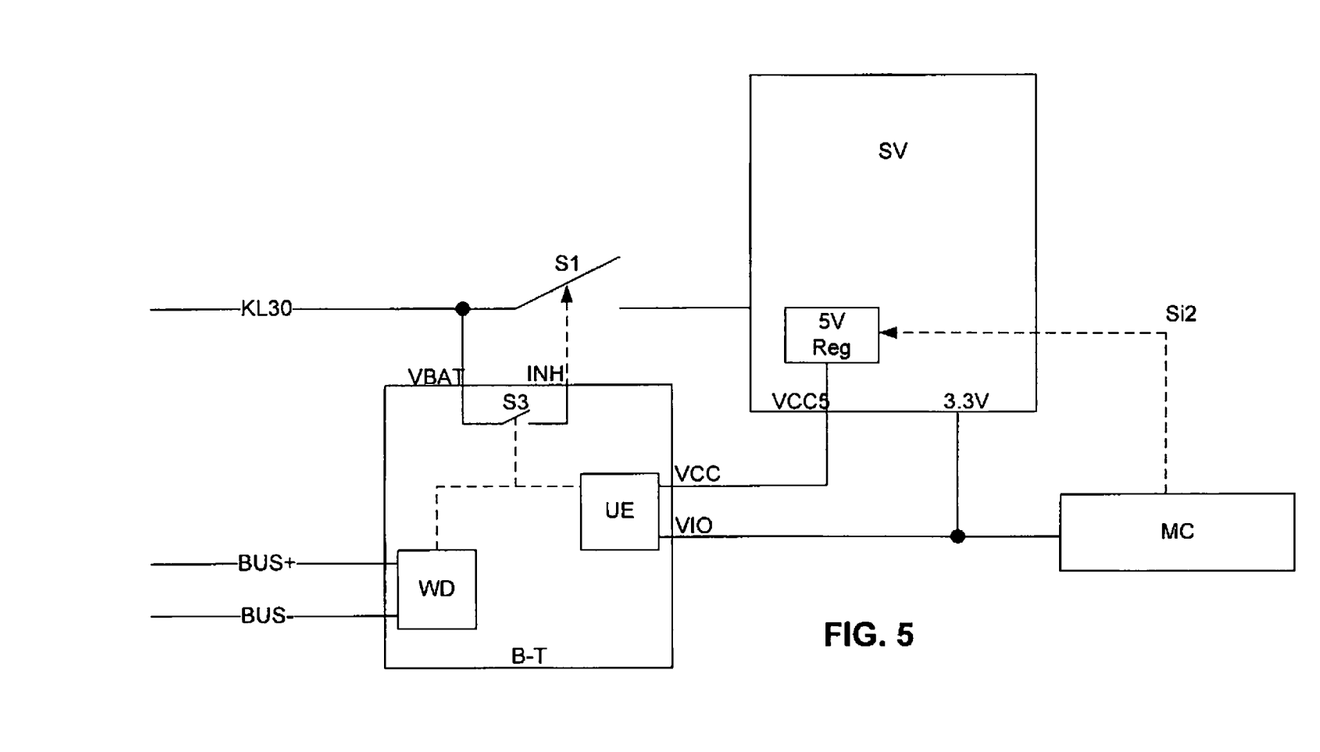
FIG. 5 shows the structure of a circuit arrangement with switchable supply voltage unit and two voltages.

FIG. 5 shows a further embodiment, in which instead of the switch S2 in one or both voltage-monitoring lines another means for controlling the supply of the voltage(s) to the monitoring device is provided, namely the controllable embodiment of the supply voltage unit (SV) itself or a component contained therein, referred to herein as Vcc-voltage stabilization module 5VReg. In this specific exemplary embodiment a CAN-BUS-network is used. Therefore, the voltage Vcc is controlled dependent on the successful initialisation of the control unit. As, moreover, the second voltage VIO is also available and the microcontroller in this exemplary embodiment is chosen such that it can also be operated with the voltage VIO, the possibility results that the supply voltage unit generates the supply voltage VCC only then and thus is fed to the monitoring device (UE) of the bus-transceiver (B-T) only if a successful initialisation of the control unit is detected.

For example a signal Si2 serves for this purpose, which in this exemplary embodiment activates the 5VReg-module, for example a circuit integrated as an ASIC integrated circuit, if the microcontroller MC is operational. Instead of the microcontroller MC, the signal can in principle be generated by another unit, for example by a separate monitoring device or a monitoring device integrated in the bus-transceiver (B-T).

Without the signal Si2 the voltage Vcc is not even generated, so that the power consumption of the control unit is considerably reduced. Preferably, however, it is implemented again in the bus-transceiver B-T that the bus-transceiver (B-T) again completely deactivates the power supply unit of the control unit by opening the first switch (S1), when after expiry of a time window triggered by the activation signal at the monitoring device (UE) of the bus-transceiver (B-T) at least one supply voltage, in this case Vcc does not correspond to the given condition.

Alternatively, however, it is also conceivable that the supply of this supply voltage to the monitoring device or generation of this supply voltage is at first started, however, is then interrupted, when successful initialisation of the control unit is not detected.

Figure 6:
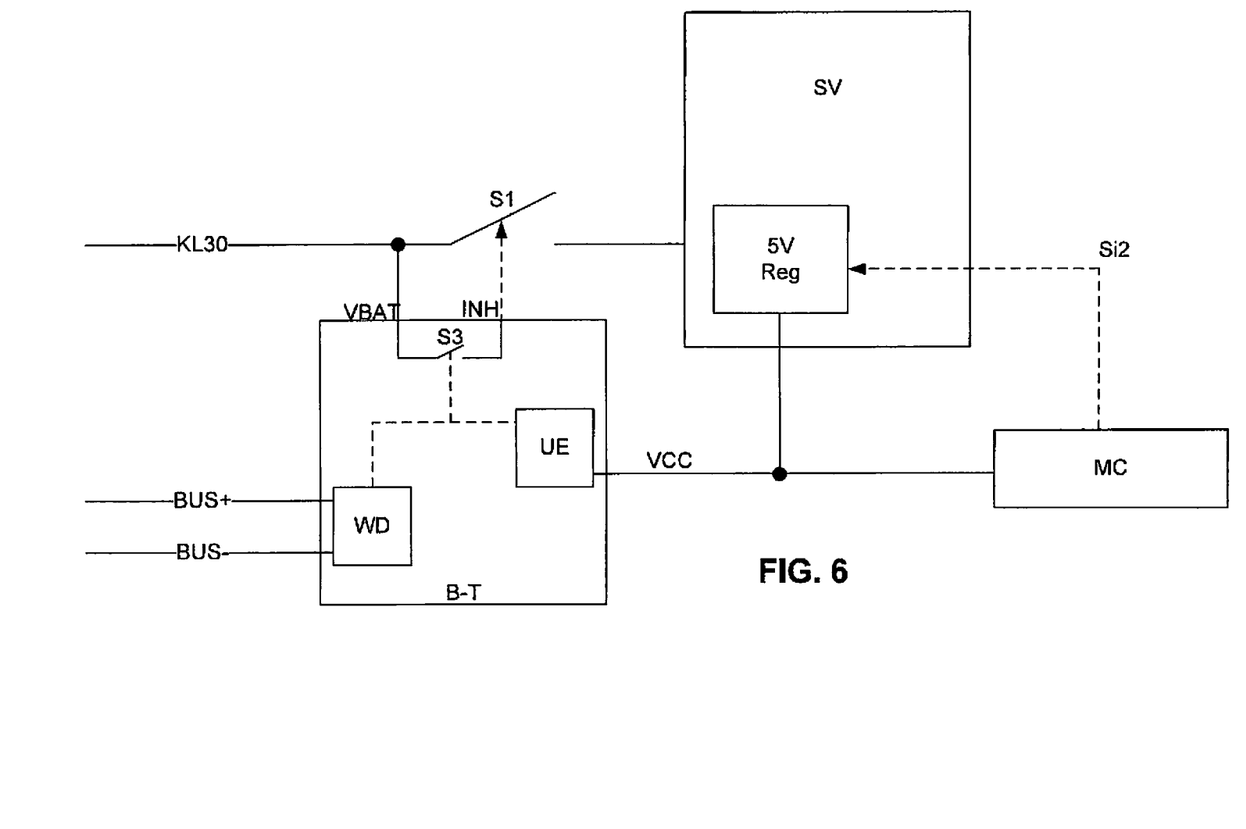
FIG. 6 shows the structure of a circuit arrangement with switchable supply voltage unit and only one supply voltage.

Such an embodiment shall now be explained on the basis of FIG. 6. Here, by the power supply unit only one voltage, for example Vcc is generated, which thus is generated after closing of the switch Si and thus is fed to the microcontroller MC, so that the latter can start. Again a switch S2 could be arranged between the node K and the monitoring device UE. If this switch shall be saved, as an alternative the solution shown in FIG. 6 can be used by embodying, for example, the signal Si2 as "disable", i.e. turn-off signal instead of an "enable"-signal in FIG. 5.

The supply voltage VCC generated by the supply voltage unit (SV) thus is at first generated with closure of the switch S1 and is also fed to the monitoring device (UE) of the bus-transceiver (B-T), however, the generation of this supply voltage and thus the supply of this supply voltage to the monitoring device is interrupted by the Si2, when successful initialisation of the control unit is not detected. This signal Si2 can be generated by the microcontroller MC or by another monitoring function in the control unit, for example in the bus-transceiver (B-T). Alternatively, also the power supply unit SV a timer function can be used analogously to that already described in the bus-transceiver (B-T), i.e. it can activate with the start of the power supply unit a timer and then can again deactivate itself automatically, unless within the given time period the microcontroller detects via the Si2 signal its operational readiness, i.e. its successful initialisation of the control unit.

The skilled person has at his disposal a number of modifications and also further combinations of features and functions of the exemplary embodiments shown here to adapt the circuit arrangement to the respective conditions in the motor vehicle, for example, BUS-networks given by the vehicle manufacturer and associated voltage sources.

LIST OF REFERENCE NUMERALS

B-T: Bus-transceiver
Bus+/Bus−: Bus-lines/bus-connection

WD: Wake-up-detector
KL30: Battery terminal
S1: First switch
S2: Second switch
S3: Integrated switch (B-T)
INH: INH-pin of bus-transceiver
UE: Monitoring device
SV: Supply voltage unit
MC: Microcontroller
VIO-A: VIO-pin (SV)
VCC-A: VCC-pin (SV)
SL1: Voltage line (SV-MC)
SUL1: Voltage-monitoring line (SV-B-T)
SUL2: Voltage-monitoring line (node (K)-B-T)
VCC-E: VCC-pin (B-T)
VIO E: VIO-pin (B-T)
K: Node (SL1-SUL2-SL1)
SUE: System monitoring device
W: Watchdog trigger
VCC Supply voltage for the monitoring device
VIO Voltage for the input-output-modules in particular in the bus-transceiver
5VReg Controllable voltage generation
Si2 Switching signal for controlling the controllable voltage generation

The invention claimed is:

1. A circuit arrangement for a motor vehicle,
wherein the motor vehicle has a signal bus adapted to carry an activation signal, and an external voltage source, and
wherein said circuit arrangement comprises:
an external input voltage terminal adapted to be connected to the external voltage source;
a signal bus terminal adapted to be connected to the signal bus;
a bus transceiver that includes a voltage monitoring device, wherein said bus transceiver is connected to said external input voltage terminal and to said signal bus terminal and is adapted to receive the activation signal from the signal bus via said signal bus terminal;
a controllable voltage supply arrangement that includes a controlled voltage output connected to a first monitoring input of said voltage monitoring device, a first voltage node and optionally an optional second voltage node, a supply voltage unit connected and adapted to supply a first voltage to said controlled voltage output via said first voltage node and optionally to supply an optional second voltage to said second voltage node if present, and a voltage control device that is connected to said first voltage node and to said controlled voltage output and that is adapted to control said first voltage supplied by said supply voltage unit via said first voltage node to said controlled voltage output;
a first switch that is connected between said external input voltage terminal and said supply voltage unit, and that has a first switch control input thereof connected to a control output of said bus transceiver; and
a control arrangement that includes a microcontroller, wherein said control arrangement is connected by a voltage supply line to said first voltage node or to said second voltage node and is connected by a control line to a control input of said voltage control device;
wherein said microcontroller is adapted to execute an initialization process, and said control arrangement is adapted to control said voltage control device via said control line responsive to and dependent on a status of said initialization process as indicated by a status signal of said microcontroller.

2. The circuit arrangement according to claim 1, wherein said bus transceiver is adapted to control said first switch, via said control output and said first switch control input, responsive to and dependent on a voltage condition monitored by said voltage monitoring device at said first monitoring input of said voltage monitoring device.

3. The circuit arrangement according to claim 1, wherein said first voltage node is connected by said voltage supply line to said control arrangement.

4. The circuit arrangement according to claim 1, wherein said controllable voltage supply arrangement includes said second voltage node, said supply voltage unit is connected and adapted to supply said second voltage to said second voltage node, and said second voltage node is connected by said voltage supply line to said control arrangement.

5. The circuit arrangement according to claim 1, wherein said controllable voltage supply arrangement includes said second voltage node, said supply voltage unit is connected and adapted to supply said second voltage to said second voltage node, said voltage monitoring device further has a second monitoring input, and said second voltage node is connected to said second monitoring input.

6. The circuit arrangement according to claim 5, wherein said first voltage node is not connected to said control arrangement.

7. The circuit arrangement according to claim 1, wherein said controllable voltage supply arrangement does not include said optional second voltage node, and said supply voltage unit is not adapted to supply said optional second voltage.

8. The circuit arrangement according to claim 2, wherein said voltage control device is a second switch interposed and connected between said first voltage node and said controlled voltage output.

9. The circuit arrangement according to claim 1, wherein said voltage control device is arranged and adapted to control said supply voltage unit with respect to supplying said first voltage to said first voltage node.

10. The circuit arrangement according to claim 9, wherein said voltage control device is incorporated in said supply voltage unit.

11. The circuit arrangement according to claim 9, wherein said voltage control device comprises a voltage stabilizer that is connected to and controllable by said control arrangement via said control line.

12. The circuit arrangement according to claim 2, wherein said control arrangement further includes a system monitoring device connected with said microcontroller and connected with said control line, wherein said system monitoring device is adapted to monitor said status of said initialization process as indicated by said status signal, and is adapted to control said voltage control device via said control line responsive to and dependent on said status of said initialization process.

13. The circuit arrangement according to claim 2, wherein the signal bus is a FlexRay bus, and said first voltage is a VIO voltage supplied at a VIO voltage output of said supply voltage unit connected to said first voltage node.

14. The circuit arrangement according to claim 2, wherein the signal bus is a CAN bus, and said first voltage is a VCC voltage supplied at a VCC voltage output of said supply voltage unit connected to said first voltage node.

15. A method of operating a circuit arrangement in a motor vehicle, comprising steps:

a) in response to an activation signal provided to a bus transceiver of said circuit arrangement, with said bus transceiver switching on electrical power to a voltage supply arrangement of said circuit arrangement;
b) after said step a), producing at least one voltage with said voltage supply arrangement;
c) supplying from said voltage supply arrangement, to a microcontroller of a control arrangement of said circuit arrangement, a supply voltage among said at least one voltage;
d) after said step c), operating said microcontroller to execute an initialization process;
e) in said control arrangement monitoring a status of said initialization process as indicated by a status signal of said microcontroller;
f) in response to and dependent on said status, selectively applying, to a monitoring input of a voltage monitoring device of said bus transceiver, a monitored voltage among said at least one voltage, wherein said monitored voltage may be the same as or different from said supply voltage;
g) with said voltage monitoring device, monitoring a voltage condition at said monitoring input; and
h) in response to and dependent on said voltage condition monitored with said voltage monitoring device, with said bus transceiver selectively switching off said electrical power to said voltage supply arrangement when said voltage condition fails to satisfy a specified condition.

16. The method according to claim 15, wherein said step f) comprises applying said monitored voltage to said monitoring input only when said status indicates that said initialization process is successful.

17. The method according to claim 15, wherein said status indicates that said initialization process is successful when said monitoring in said step e) determines at least one of the following:
    a) a predetermined stage of said initialization process is reached,
    b) said initialization process is completed, or
    c) said initialization process is completed and a watchdog of said circuit arrangement is triggered for a first time.

18. The method according to claim 15, wherein said step f) comprises initially applying said monitored voltage to said monitoring input, and then interrupting said applying of said monitored voltage to said monitoring input when said status indicates that said initialization process is not successful.

19. The method according to claim 15, wherein said specified condition is satisfied when said monitored voltage has been applied to said monitoring input in said step f) within a pre-specified voltage range and within a pre-specified time period for success of said initialization process after receiving said activation signal.

20. A method of operating a circuit arrangement of a control unit in a motor vehicle, wherein the circuit arrangement converts an activation signal transmitted from a bus-network to the control unit, comprising:
    a) a bus-transceiver of the circuit arrangement receives the activation signal transmitted via a bus-connection to the control unit,
    b) a first switch of the circuit arrangement is controlled by the bus-transceiver,
    c) a supply voltage unit of the circuit arrangement is controlledly connected via the first switch to an external voltage input and generates at least one supply voltage for at least one microcontroller of a control arrangement of the circuit arrangement,
    d) via the at least one microcontroller an initialization of the control unit is initiated, and
    e) a voltage monitoring device of the bus-transceiver monitors at least one monitored voltage among the at least one supply voltage generated by the supply voltage unit, wherein the at least one monitored voltage is fed via a voltage-monitoring line of the circuit arrangement to the voltage monitoring device of the bus-transceiver only when the initialization of the control unit is successful as indicated by a status signal of the at least one microcontroller, and the feeding of the at least one monitored voltage to the voltage monitoring device or the generating of the at least one monitored voltage by the supply voltage unit is interrupted when the initialization of the control unit is not successful as indicated by the status signal of the at least one microcontroller, wherein the controlling of the first switch by the bus-transceiver comprises the bus-transceiver closing the first switch upon receipt of an activation signal, and the bus-transceiver again opening the first switch and thereby deactivating the supply voltage unit when, after expiry of a time window triggered by the activation signal, the at least one monitored voltage does not correspond to a specified condition.

* * * * *